(12) United States Patent
DeWitte

(10) Patent No.: US 12,737,066 B2
(45) Date of Patent: Sep. 15, 2026

(54) MORPHABLE SURFACE

(71) Applicant: Anne DeWitte, Fairport, NY (US)

(72) Inventor: Anne DeWitte, Fairport, NY (US)

( * ) Notice: Subject to any disclaimer, the term of this patent is extended or adjusted under 35 U.S.C. 154(b) by 0 days.

(21) Appl. No.: 18/827,815

(22) Filed: Sep. 8, 2024

(65) Prior Publication Data

US 2024/0427447 A1 Dec. 26, 2024

Related U.S. Application Data

(63) Continuation-in-part of application No. 17/897,163, filed on Aug. 28, 2022, now abandoned.

(51) Int. Cl.
*G06F 3/041* (2006.01)
*G06F 3/03* (2006.01)

(52) U.S. Cl.
CPC ........ *G06F 3/04144* (2019.05); *G06F 3/0308* (2013.01); *G06F 3/0412* (2013.01)

(58) Field of Classification Search
None
See application file for complete search history.

(56) References Cited

U.S. PATENT DOCUMENTS 9,142,105 B1 * 9/2015 Crofford ................ G06F 3/016
2011/0199321 A1 * 8/2011 Kyung .................... G06F 3/041 345/173
2016/0299602 A1 * 10/2016 Shuster .................. G06F 3/016
2018/0364832 A1 * 12/2018 Kong ................. G06F 3/04166

* cited by examiner

*Primary Examiner* — Stephen T. Reed
(74) *Attorney, Agent, or Firm* — Jong Patent Firm; Cheng Ning Jong; Tracy P. Jong

(57) ABSTRACT

A morphable surface including a support structure including a top surface and a bottom surface and at least one shape element including a head, a base plate, a post configured to connect the head and the base plate and be slidably disposed through an opening in the support structure, a spring configured to be disposed between the bottom surface of the support structure and the base plate, an actuator configured to urge against the base plate and be disposed in a first state and a second state, wherein the first state corresponds to a state in which the actuator is configured to push against the base plate in a push action in a first direction from the base plate to the head and the second state corresponds to a state in which the push action is removed, and a compressible element disposed between the actuator and the base plate.

16 Claims, 12 Drawing Sheets

MORPHABLE SURFACE

PRIORITY CLAIM AND RELATED APPLICATIONS

This continuation-in-part application claims the benefit of priority from non-provisional application U.S. Ser. No. 17/897,163 filed Aug. 28, 2022. Said application is incorporated by reference in its entirety.

BACKGROUND OF THE INVENTION

1. The Field of the Invention

The present invention relates to a machine controller adaptable to each of a plurality of machines. More specifically, the present invention is directed to a machine controller having a control surface adaptable to each of a plurality of machines.

2. Background Art

Historically, human-machine interaction has relied on physical manipulatives, such as the handle on a lever or a dial on a radio. As machines have become more complex, our methods of interaction have evolved. Where we once used physical buttons, dials, and switches, we are now presented with virtual representations of the same objects though touchscreens. The touchscreen advantages are many: high resolution graphics, reusable surface, flexibility, lower cost to maintain, and easy to clean. However, without a tactile interface we lose usability in areas such as target acquisition and selection feedback. Although compensations have been made, a non-tactile surface is an added hardship for the visually impaired. A method for controlling a machine that combines the visual and refreshable attributes of a touchscreen with the usability and accessibility benefits of physical manipulatives would be a significant improvement in human machine interfaces.

Efforts that combine these interface attributes are found at research institutions and in intellectual property, but commercial success is limited. Much of this effort and the limited market success are focused on surface haptics, e.g., in the integration of vibrotactile feedback with touchscreens. For example, a mobile phone or smart watch will vibrate in reaction to a state change such as a phone call or incorrect pin entry. Next generation surface haptics tend to localize the vibration effect to create texture and edge sensations on a touchscreen. While there is still room for further innovation, these incremental tactile additions to a smooth touchscreen architecture will not provide the tactile bandwidth required to produce an effective physical manipulative.

Where surface haptics modify a touchscreen which is primarily visual, the interaction of a tangible user interface (TUI) is primarily tactile. For example, the Reactable music synthesizer produces digital effects through the manipulation of specialized objects placed on a touch surface. As with other TUI implementations similar to the Reactable music synthesizer, the manipulated objects are fixed shape and size. Though these objects may be easily recognizable by touch, their static structure hinders transformation of the surface for other purposes.

An alternative TUI is called a shape display. These displays use a grid of actuators to raise or lower areas on a surface that creates edges detectable by touch, i.e., dynamic shape generation. Though not as detailed as fixed shape objects, the displays create recognizable, 2.5 dimensional shapes that are refreshable. One example is the inForm® project created by the Tangible Media Group at the Massachusetts Institute of Technology. inForm® uses gestures to manipulate a surface composed of individually controlled, illuminated pins. Variations of inForm® perform tasks such as shape generation, direct tactile recognition, material simulation, and 3D data display. Despite the creativity and innovation of these projects, a commercial product directly related to this approach has yet to be realized. Market success, however, is found in refreshable, high density, pin-based surfaces for the visually impaired. The purpose of these surfaces is to dynamically generate tactile graphics and/or braille codes. For example, the product Graphiti® by Orbit® is a tablet sized device with a 60×40 matrix of refreshable pins that provides a visually impaired person access to any form of graphical information. It is worth noting, the Graphiti® and similar devices do not include visual output. Due to the high component costs and limited market size, broad placement and optimization of these devices is limited.

Every day, people of varying abilities control machines, whether the machine is a home appliance or an industrial printer. Interestingly, of all the surface haptic and tangible user interface applications, few if any are focused on machine controls beyond a simple button press or swipe. Expanding our human-machine interaction beyond the flat touch screen is a needed and underdeveloped digital application space.

There exists a need for a device and method for controlling a machine where the shape display combines the visual and refreshable attributes of a touchscreen with the usability and accessibility benefits of physical manipulatives. Further there exists a need for a device and method capable of providing universal interfaces to reduce the need for specialized and dedicated interfaces, thereby simplifying the human machine interfaces.

SUMMARY OF THE INVENTION

In accordance with the present invention, there is provided a morphable surface for receiving a tactile input of a user and displaying to the user, the morphable surface including:

(a) a support structure including a top surface and a bottom surface; and (b) at least one shape element including:

(i) a head;

(ii) a base plate;

(iii) at least one post configured to connect the head at a top end of the at least one post and the base plate at a bottom end of the at least one post and the at least one post is further configured to be slidably disposed through an opening in the support structure;

(iv) a spring configured to be disposed between the bottom surface of the support structure and the base plate;

(v) an actuator configured to urge against the base plate, the actuator further configured to be disposed in a first state and a second state, wherein the first state corresponds to a state in which the actuator is configured to push against the base plate in a push action in a first direction from the base plate to the head and the second state corresponds to a state in which the push action is removed; and (vi) a compressible element disposed between the actuator and the base plate, wherein when the actuator is disposed in the first state, the actuator comes in contact with the base plate and pushes against the base plate, compressing the spring and urging the head in the first direction, when the actuator is disposed in the second state, the push action is removed, allowing the spring to urge the head in the second direction and a tactile input of the user pushes against the compressible element allowing the shape element to be moved in the second direction.

In one embodiment, the morphable surface further includes an input sensor configured to detect a contact of a user at the head and the input sensor is configured to be disposed on the bottom surface of the support structure between the spring and the support structure. In one embodiment, the morphable surface further includes a light emitter configured to be disposed on the top surface of the support structure between the head and the support structure. In one embodiment, the head is a lens constructed from a light-transmissible material.

In accordance with the present invention, there is further provided a morphable surface for receiving a tactile input of a user and displaying to the user, the morphable surface including:

- (a) a support structure including a top surface and a bottom surface; and
- (b) at least one shape element including:
  - (i) a head;
  - (ii) a base plate;
  - (iii) at least one post configured to connect the head and the base plate, wherein the at least one post disposed through an opening in the support structure;
  - (iv) a well defining a volume for holding a resistive fluid, the viscosity of the resistive fluid is configured to be controllable;
  - (v) a rod configured to extend from the base plate and be slidingly disposed through a periphery of the well and immersed within the resistive fluid; and
  - (vi) a spring configured to be disposed between the bottom surface and the well, wherein the tactile input of the at least one shape element at the head in a direction from the head to the base plate causes a reactive force to be developed in resisting a movement of the block in the resistive fluid to temper a speed at which the block is moved with respect to the well and causes the spring to be compressed and when the tactile input is removed, the spring assists in returning the block to its position prior to the application of the press and the movement of the block in the resistive fluid is inversely proportional to the viscosity of the resistive fluid.

In one embodiment, the morphable surface further includes a light emitter configured to be disposed on the top surface of the support structure between the head and the support structure. In one embodiment, the head is a lens constructed from a light-transmissible material. In one embodiment, the morphable surface further includes a controller configured to detect an electrical resistance of the resistive fluid, wherein the electrical resistance of the resistive fluid corresponds to a degree of the tactile input.

In accordance with the present invention, there is further provided a machine controller for controlling at least one machine, the machine controller including:

- (a) a control surface including a plurality of alterable physical properties; and
- (b) a control device is functionally connected to the control surface and configured to communicate via a communication with the at least one machine, wherein the control device is configured to change at least one of the plurality of alterable physical properties of the control surface based on a first input and a second input, the first input is configured to be received from the at least one machine and the second input is configured to be received from the control surface and the control device is configured to generate an instruction to change at least one of the plurality of alterable physical properties of the control surface in response to the first input and the control device is further configured to generate an instruction to control the at least one machine in response to the second input, wherein the at least one machine includes a visual display and the machine controller is a remote controller.

In one embodiment, the plurality of alterable physical properties include shape, color, texture, surface properties or any combinations thereof. In one embodiment, the color is configured to be displayed in a plurality of hues and a plurality of luminosity levels. In one embodiment, the shape includes a dial, a button, a switch, a slider, a knob, a directional pad or any combinations thereof. In one embodiment, the control surface includes a support structure, a shape element disposed in a first position and an intersecting relationship with respect to the support structure and an actuator configured to dispose the shape element in a second position. In one embodiment, the machine controller further includes a resilience member configured to return the shape element to the first position. In one embodiment, the machine controller further includes a shape element contact detector configured to detect a contact with the shape element, wherein the second input includes a contact input to the shape element. In one embodiment, the contact is of touch and pressure, the shape element contact detector for touch is a capacitive touch detector and the shape element contact detector is a resistive touch detector. In one embodiment, the machine controller further includes a light emitter. In one embodiment, the machine controller further includes a detector configured to detect the presence of an occurrence to trigger a third input based on the detection of the occurrence, wherein the total input further includes the third input. In one embodiment, the machine controller further includes an audio component configured for emitting sound, wherein the audio component is functionally connected to the control device. In one embodiment, the control surface includes a support structure, a shape element disposed in a first position and an intersecting relationship with respect to the support structure and a resistance controller configured to present a variable resistance to a movement of the shape element to a second position.

An object of the present invention is to provide a human-machine interface that is adaptable to control at least one machine.

Another object of the present invention is to provide a human-machine interface that supplies adaptable tactile interactions.

Another object of the present invention is to provide a human-machine interface that supplies adaptable multimodal interactions including tactile, visual and audio interactions.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—machine controller
4—machine
6—control surface
7—support structure
8—controller
10—alterable physical property of control surface
12—alterable physical property of control surface
14—communication
16—surface feature
18—surface feature
20—surface feature
22—surface feature
24—head
26—post
28—resilience member or spring
30—actuator or combined actuator and sensor
32—plate
34—light emitter
36—shape element
37—surface feature
38—switch at off state
40—switch at on state
42—shape element
44—shape element
46—shape element
48—shape element
50—input sensor
52—axis
54—user
56—sensor or detector
58—well
60—resistive fluid
62—rod
63—block
64—finger of user
66—shape element in depressed position
68—direction
70—electrical resistance sensor
72—through hole
74—resistive fluid viscosity controller

PARTICULAR ADVANTAGES OF THE INVENTION

The present machine controller provides tactile operation of an adaptable human-machine interface, thereby improving the usability and accessibility for sighted, low vision, and blind users.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
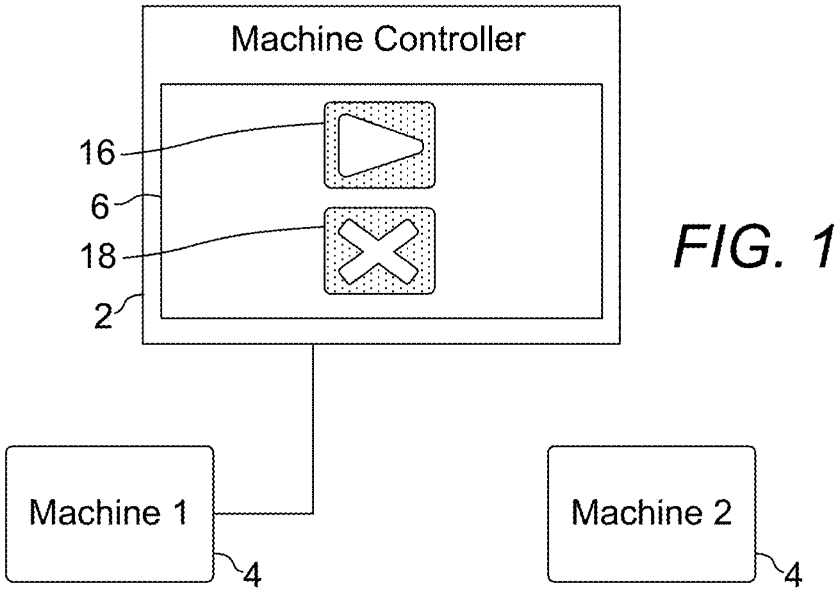
FIG. 1 is a diagram depicting one example of a machine controller configured for communicating with one of a plurality of machines.

Disclosed herein is a machine controller 2, e.g., a remote controller, for controlling at least one machine 4, e.g., a device generally having a visual display configured to also provide an audio output. Such a device can include a television (TV) or a vehicle infotainment system. FIG. 1 is a diagram depicting one example of a machine controller 2 configured for communicating with one of a plurality of machines 4, i.e., Machine 1 and Machine 2. When used as a TV, Machine 1 can be a TV in one room and Machine 2 can be a TV in a second room. When used as a vehicle infotainment system, Machine 1 can be a main infotainment system disposed at the dash area of a vehicle and Machine 2 can be a secondary infotainment system disposed on the back of a front seat for the benefit of a rear-seating passenger or a main infotainment system of a second vehicle. As shown in this figure, a communication is shown to occur between the machine controller 2 and Machine 1 with a line drawn to connect the machine controller 2 and Machine 1. The machine controller 2 includes a surface feature 16 and a surface feature 18. In one embodiment, a surface feature is depressible. For instance, in interacting with the surface features 16, 18, a user may depress each surface feature to select a function the surface feature represents. For instance, the central part of surface feature 16 appears as a triangle with one of its peaks pointing to the right. This symbol is universally understood as a "play" button. Therefore, upon getting the button depressed, the user of the machine controller 2 expects the Machine 1 to perform a certain "play" function, e.g., the playing of a movie at the Machine 1, etc. The central part of surface feature 18 appears as an "X." This symbol is universally understood as a "stop" button. Therefore, upon getting the button depressed, the user of the machine controller 2 expects the machine 4 to stop certain activity that was associated with the "play" function started with the "play" button. A conventional controller includes a set of fixed and pre-configured buttons where the conventional controller is only useful for controlling one machine or one type of machines. Therefore, its function is limited and for each machine, a separate machine controller is required. It is this limitation that the Applicant sought to overcome. Although a machine controller can be programmed to output a unique screen display when connected to a particular machine, the conventional controller is incapable of providing an interface screen having surface features that can be detected by a user's tactile sensory organs. It is possible to provide a generic interface including all possible surface features which a user may distinguish from one another. However, such an interface would almost be overly expansive in its surface features, rendering its relevant surface features for a particular machine the controller interacts with, difficult to be discerned from other unrelated surface features on the interface, even also with the aid of vision. Therefore, for a machine controller to be tactilely useful while capable of interfacing with various machines (which require different sets of features), the machine controller must be capable of providing only tactile features, e.g., pushbuttons, slides, etc., relevant to the currently connected machine.

Figure 2:
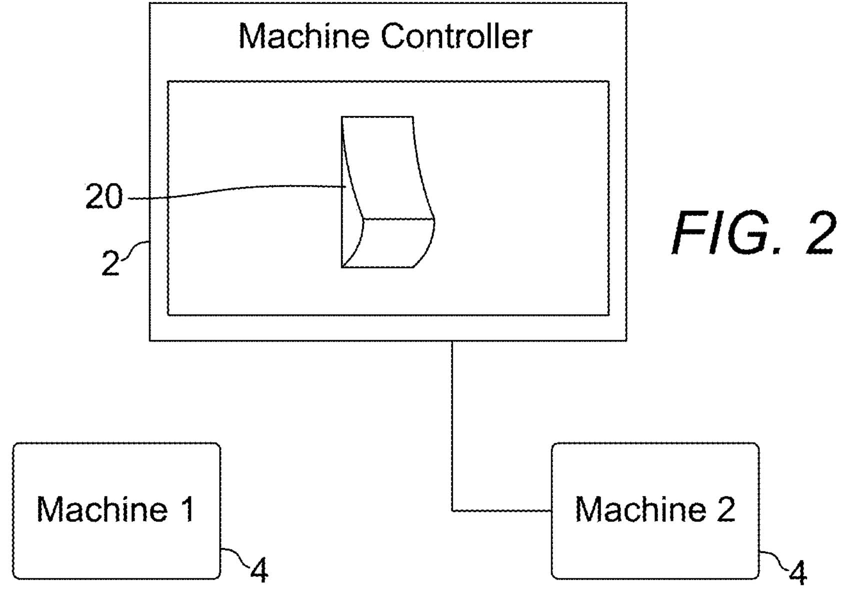
FIG. 2 is a diagram depicting one example of a machine controller configured for communicating with one of a plurality of machines.

FIG. 2 is a diagram depicting one example of a machine controller configured for communicating with one of a plurality of machines 4. As shown in this figure, a communication is shown to occur between the machine controller 2 and Machine 2 with a line drawn to connect the machine controller 2 and Machine 2. Here, as Machine 2 performs one or more functions that are different from Machine 1, the surface feature/s required of Machine 2 at the machine controller 2 are different from those found on the machine controller 2 when it interacts with Machine 1. Here, the surface feature 20 shown is a switch.

Figure 3:
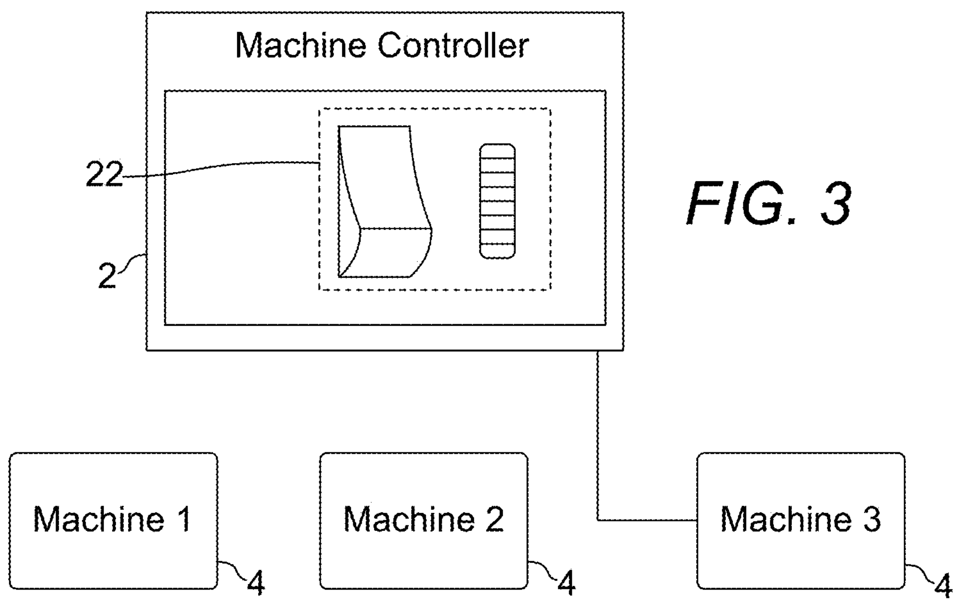
FIG. 3 is a diagram depicting one example of a machine controller configured for communicating with one of a plurality of machines.

FIG. 3 is a diagram depicting one example of a machine controller configured for communicating with one of a plurality of machines. Again, a communication is shown to occur between the machine controller 2 and a machine 4. Here, a line has been drawn to connect the machine controller 2 and Machine 3. Here, as Machine 3 performs one or more functions that are different from Machine 1 or Machine 2, the surface feature/s required of Machine 3 at the machine controller 2 are different from those found on the machine controller 2 when it interacts with Machine 1 or Machine 2. Here, the surface feature 22 shown is a switch with an adjustment mechanism.

Figure 4:
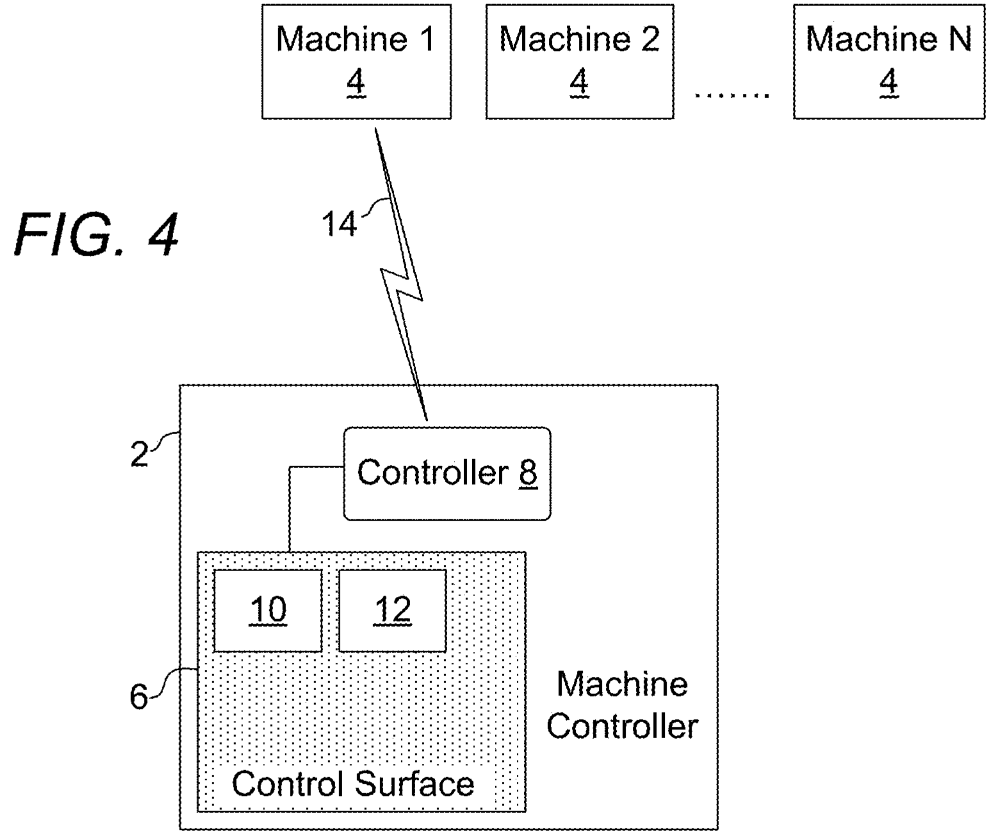
FIG. 4 is a block diagram depicting an interaction of a present machine controller with a one of a plurality of machines.
Figure 4A:
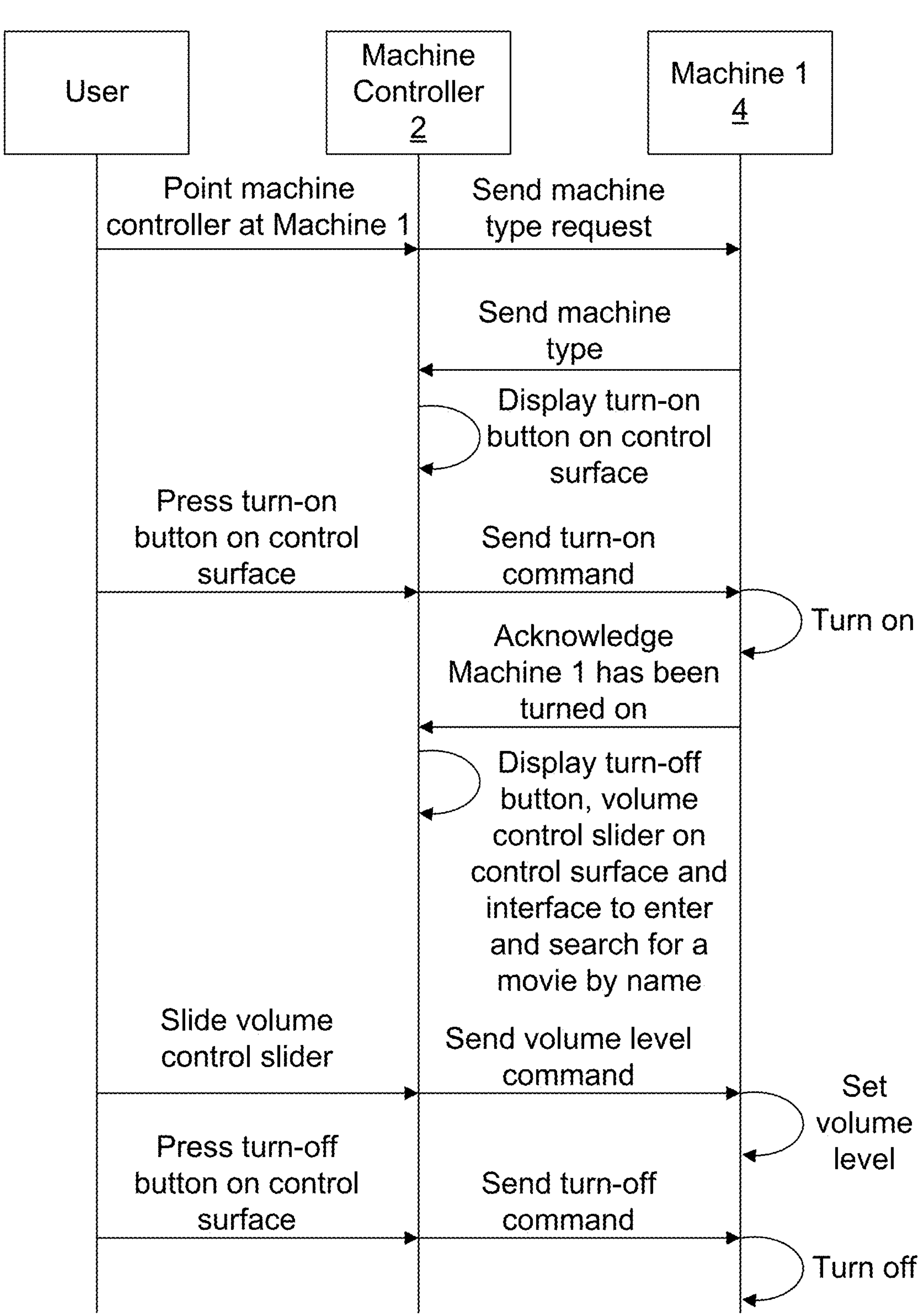
FIG. 4A is an interaction diagram depicting examples of interactions between a user, a machine controller and a machine in using the machine.

FIG. 4 is a block diagram depicting an interaction of a present machine controller 2 with one of a plurality of machines 4. The machine controller 2 includes a control surface 6 including a plurality of alterable physical properties, e.g., physical properties 10, 12; and a controller 8 functionally connected to the control surface 6. The controller 8 is configured to communicate via a communication with a machine 4. In one embodiment, the communication 14 is a wireless communication and the machine controller 2 is a wireless remote controller. In another embodiment, the communication is a wired communication and the machine controller 2 is a wired remote controller. A remote controller allows a machine 4 to be controlled at a distance, e.g., greater than about 1 ft, from the machine 4. In one example, the communication includes transfer of data indicating the type or configuration of the machine to the machine controller 2. In another example, the communication includes gathering of data by the machine controller 2 of the machine 4 based on a visual technique, e.g., via a QR code. The controller 8 is configured to change at least one of the plurality of alterable physical properties of the control surface 6 based on a total input comprised of a first input and a second input. The first input is configured to be received from the machine 4 and the second input is configured to be received from the control surface. The controller 8 is configured to generate an instruction to affect at least one of the control surface 6 and the machine 4. For instance, when a machine completes a task, it conveys a status as a first input to the controller 8 such that the controller can issue an instruction to the control surface 6 that reflects the status of the machine 4, toggling a button to indicate that the machine is ready for another task. In another instance, when a machine needs to be paused during the execution of a task, a "pause" button on the control surface 6 can be pressed to alter its state to indicate that the task is being paused at the machine 4 while an instruction is communicated to the machine 4 for the task to be paused. An alterable physical property can be the shape, color, texture, surface properties or any combinations of these physical properties. In one embodiment, the shape includes a shape selected from the group consisting of a dial, a button, a switch, a slider, a knob, a directional pad and any combinations thereof. In one embodiment, the machine controller further includes an audio component configured for emitting sound, where the audio component is functionally connected to the controller. By way of a non-limiting example, a machine is shown to communicate with a machine controller in FIG. 4A under the participation of a user. FIG. 4A is an interaction diagram depicting examples of interactions between a user, a machine controller 2 and a machine 4 in using the machine 4. First, in order to communicate with a machine 4, e.g., a TV, a vehicle infotainment system, or generally a visual display, and a machine controller, e.g., a TV or vehicle infotainment remote controller 2 is pointed at the machine 4 within a communication envelope of both the machine controller 2 and the machine 4. When a request for the machine type of the machine 4, has been communicated by the machine controller 2 to a machine 4, the machine 4 responds by communicating a response that contains its type to the machine controller 2, informing the machine controller 2 of the features configured to display on the control surface of the machine controller 2. Armed with the knowledge of the type of machine, the control surface of the machine controller 2 is configured to morph into a control surface having relevant features, e.g., a button, when pressed, sends a turn-on command to the machine 4 to turn on the machine 4. It shall then be noted that the button provided on the control surface is tailored to suit the machine 4 and the condition of the machine 4, i.e., the machine 4 is disposed in the off-state. While the machine 4 is disposed in an off state, the control surface of the machine controller 2 may be provided to turn on the machine 4. With only a button configured to turn on the machine 4, the user does not need to thumb through the control surface of the machine controller 2 to locate the switch to turn on the machine 4. Upon getting turned on, the machine 4 is configured to send back a message that the machine 4 has been successfully turned on. Upon receiving this acknowledgement, the machine controller 2 can be programmed to display a turn-off button, a slider allowing volume control and an interface in which the user can type in a title of a video or audio program to be search and a button to scroll to a selection and select a program. In this example, there may be a default program that is shown on the machine 4. If default program will continue to be shown until it is changed. In this example, the default program was not changed. The user merely changes the audio volume of the program by holding and moving the slider which controls the volume of the program. A volume level is then communicated to the machine 4 which subsequently adjusts its volume level according to the volume level received from the machine controller 2. As the control surface of the machine controller 2 now displays only several features with these features easily located, even only by touch. The user is shown to proceed with turning off the machine 4 by pressing the turn-off button on the machine controller 2.

Figure 5:
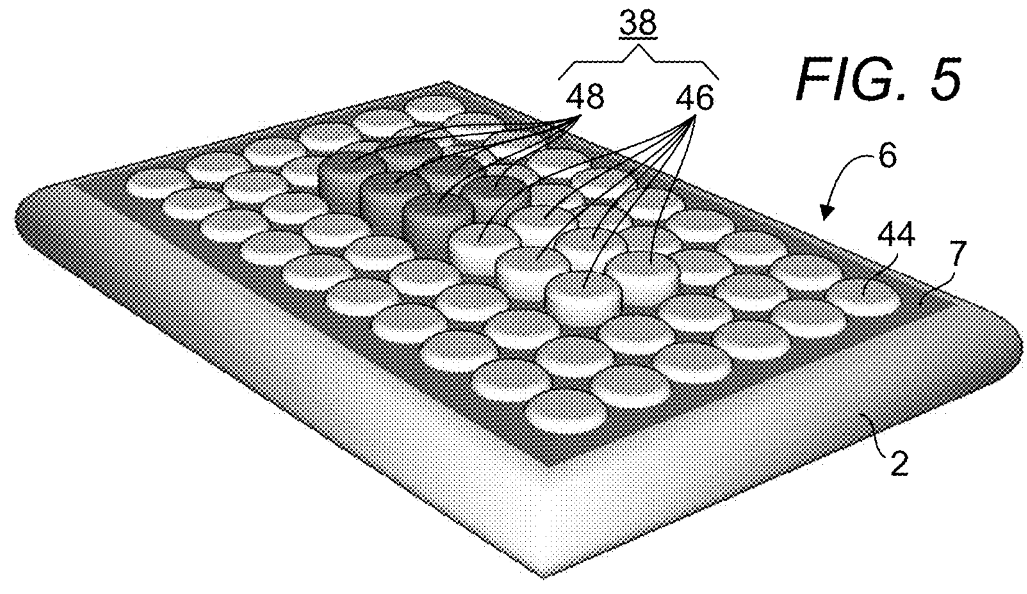
FIG. 5 is an example of a control surface of a present machine controller.

FIG. 5 is an example of a control surface of a present machine controller 2. It shall be noted that the control surface 6 includes a surface texture or feature defined by shape elements disposed at different heights. For instance, shape elements 44 are disposed at a lowest level while shape elements 46 are disposed at a level higher than shape elements 44. Shape elements 48 are disposed at a level higher than both groups of shape elements 44 and 46. Together, groups of shape elements 46 and 48 represent a surface feature in the form of a switch 38 disposed in its "off" state. The difference in height between at least two shape elements helps define at least one surface feature. It shall be appreciated that by selectively varying the heights of the shape elements, surface features of different shapes can be formed. For instance, the shapes shown in FIGS. 1-3 can be formed by selectively raising shape elements at various areas of the control surfaces 6 shown in these figures. As shown elsewhere herein, the illumination associated with each shape element can also be altered in real-time, just as the height of the shape element, to provide a color to a shape element when viewed by a user of the control surface.

Figure 6:
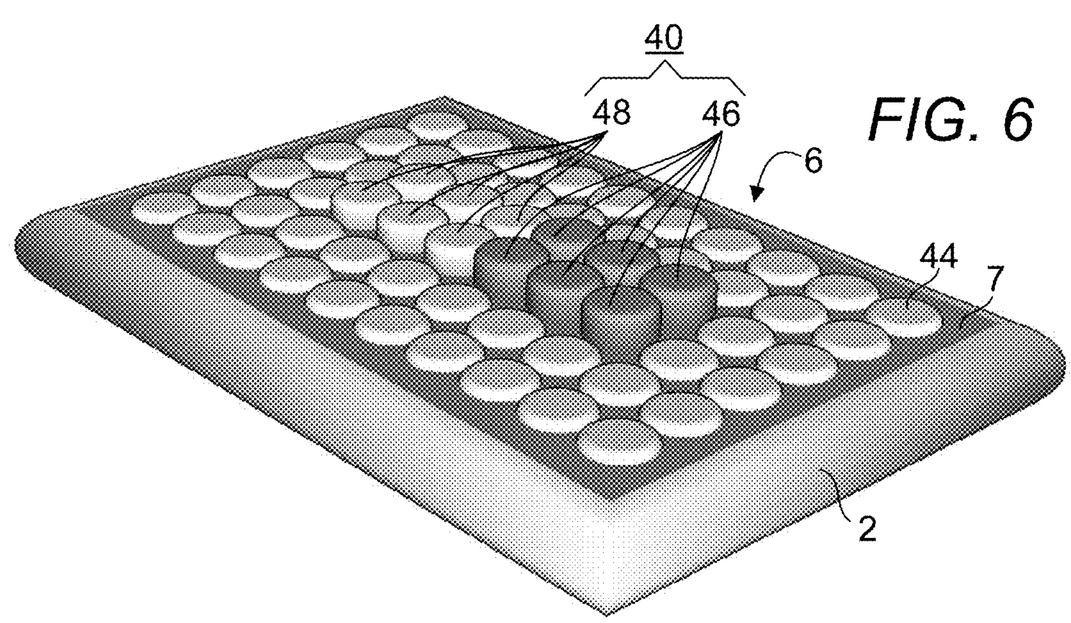
FIG. 6 is an example of a control surface of a present machine controller.
Figure 7:
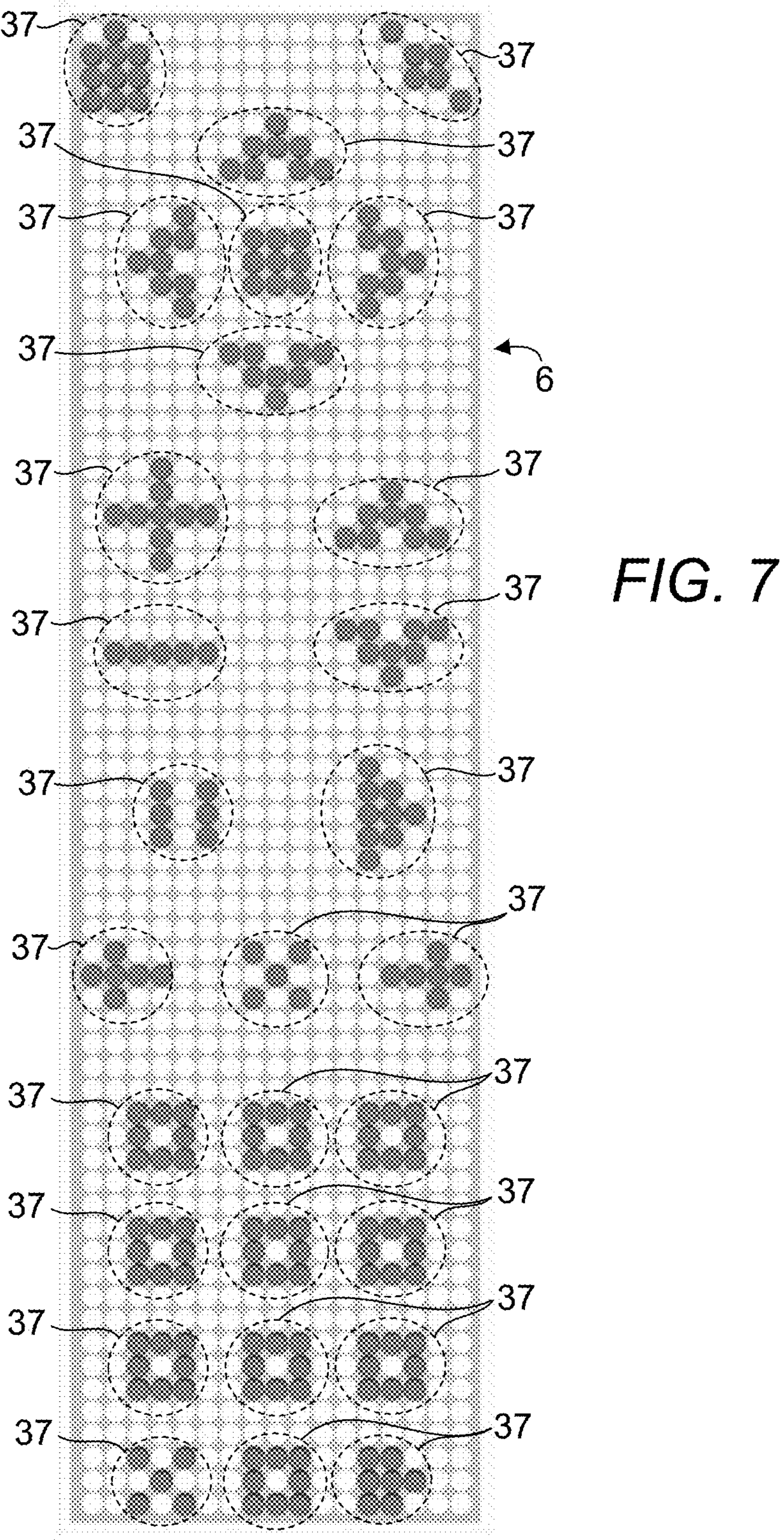
FIG. 7 is an example of a control surface of a present machine controller.
Figure 8:
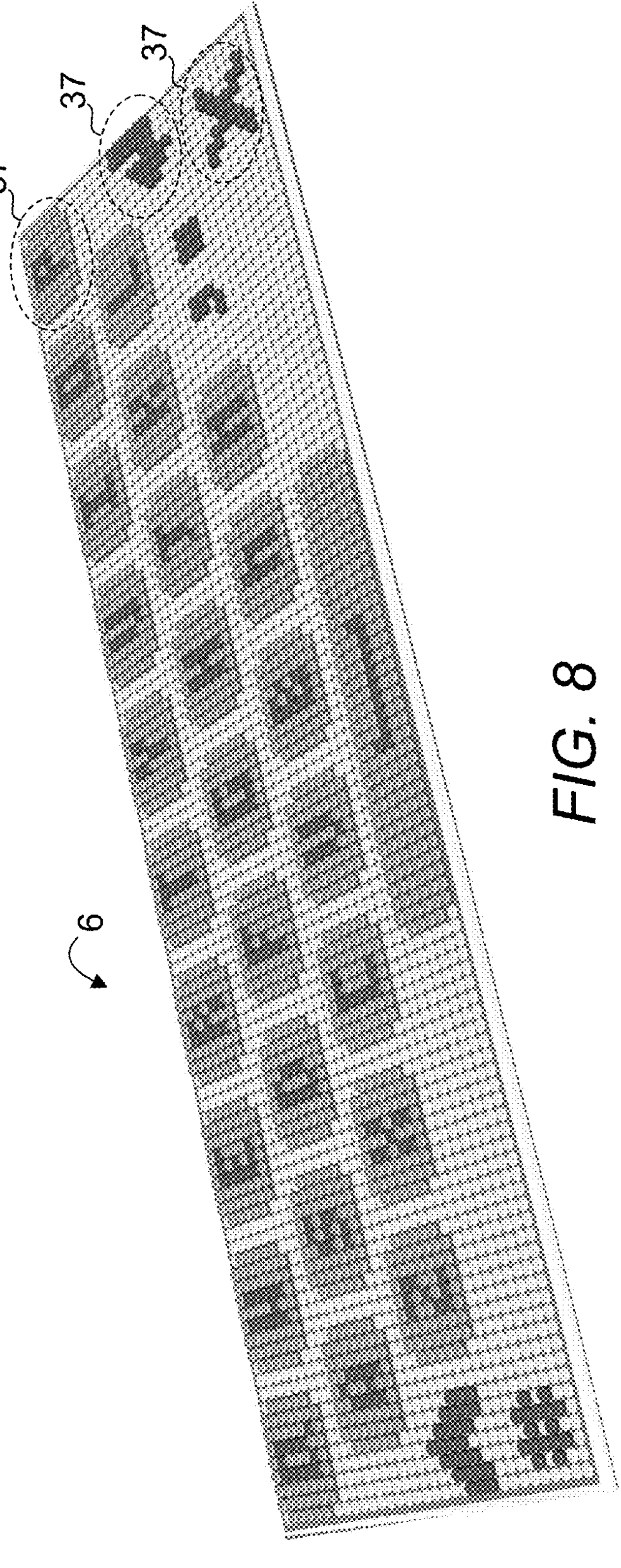
FIG. 8 is an example of a control surface of a present machine controller.
Figure 9:
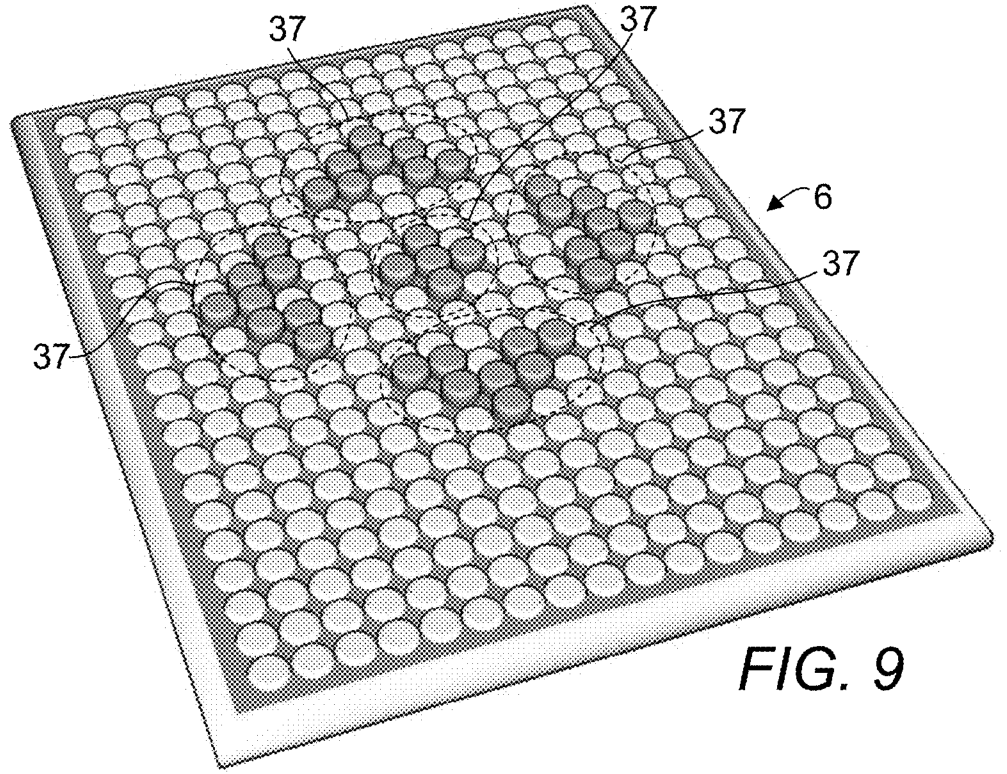
FIG. 9 is an example of a control surface of a present machine controller.

FIG. 6 is an example of a control surface of a present machine controller. Referring back to FIG. 5, shape elements 46 and 48 together represent a switch 38 in the "off" state. Here, groups of shape elements 46 and 48 together represent the switch of FIG. 5 now being disposed in the "on" state with the switch 40 of FIG. 5 having been pressed. It shall be noted that as the shape elements 46 in FIG. 6 are now disposed in a shade or illuminated state that is different from the shape elements 46 shown in FIG. 5. FIG. 7 is an example of a control surface of a present machine controller. With a sufficiently large control surface 6, i.e., a surface with sufficiently numerous shape elements, the shape elements can collectively display one or more features where a feature can be a physical manipulative. Here, the control surface 6 is configured as a universal remote controller as the surface is sufficiently large to allow various surface features 37 to be made available. FIG. 8 is an example of a control surface of a present machine controller. Here, the control surface 6 is configured as a keyboard as the surface is sufficiently large to allow various surface features 37 to be made available. FIG. 9 is yet another example of a control surface of a present machine controller. Here, the control surface 6 is configured as a directional pad as the surface is sufficiently large to allow various surface features 37 to be made available. Each surface feature 37 is formed in the shape of a triangle on the periphery of a collection of triangles orientated in a diamond shape and a cross disposed in the center of the diamond shape. In this instance, each surface feature 37 in this figure is a physical manipulative, that when pressed, would send an input to a controller which would in turn send an instruction to a machine in a direction indicated by the physical manipulative. Referring to FIGS. 7-9, the differences in shade or illuminated state are used to enhance the groups of shape elements or surface features 37. It shall be noted that the groups of shape elements, formed in the shape of a circle, triangle, oval, square or rectangle, may be distinguished from their surroundings by using one or more shades or colors. The shape elements may additionally be disposed at one or more levels that are different from the level at which the surroundings of the groups of shape elements are disposed.

Figure 10:
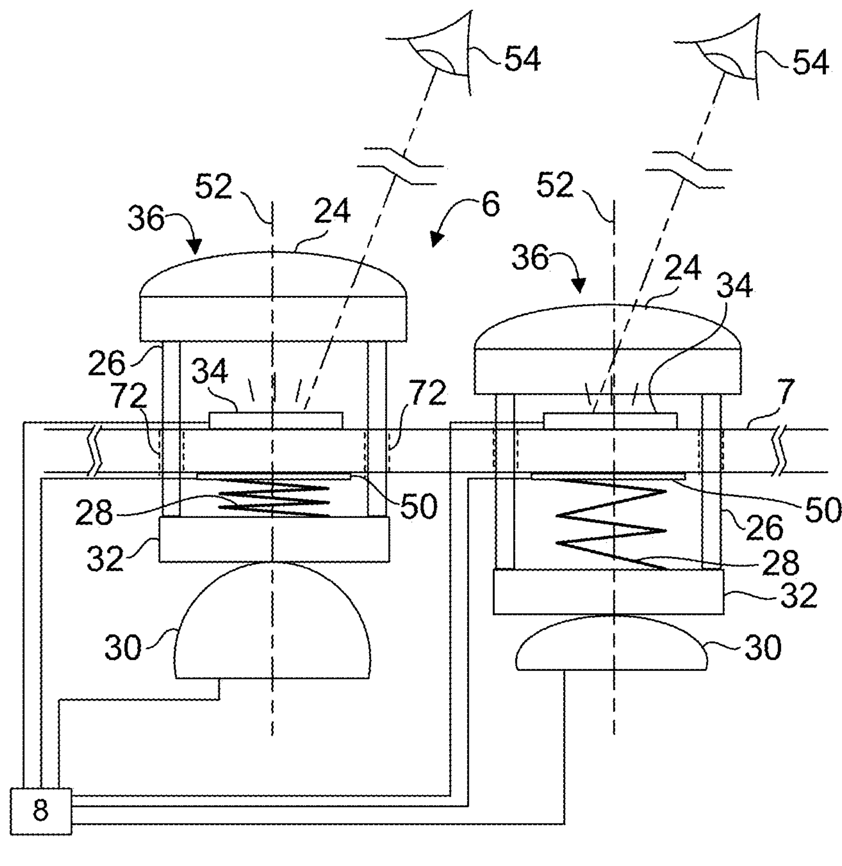
FIG. 10 is a diagram depicting an example of a control surface of a present machine controller.

FIG. 10 is a diagram depicting an example of a control surface 6 of a present machine controller where the control surface is morphable using the shape elements disclosed herein. Only two shape elements 36 are shown. The control surface includes a support structure 7, the shape element 36 on the right side is disposed in a first position and an intersecting relationship with respect to the support structure 7 and an actuator 30 configured to dispose the shape element 36 in a second position as shown in the shape element 36 disposed on the left side. The shape element 36 on the left side is disposed in a raised condition while the shape element 36 on the right side is disposed in a lowered condition. Each shape element includes a head 24, e.g., a lens, e.g., one constructed from a light-transmissible material, a base plate 32, a member, e.g., at least one post 26, connecting the head 24 and the base plate 32 and an actuator 30 configured to mobilize the shape element along a central axis 52 where the at least one post 26 is disposed through and supported by the support structure 7. In one embodiment, each post 26 is disposed through an opening or through hole 72 in the support structure 7. Although two posts 26 are shown connecting a head 24 at one end to a base plate 32 at the other end, one post may suffice provided that the resulting shape element is sufficiently rigid and capable of being raised upon actuation of the actuator 30 or returning to its lowered position once actuation of the actuator 30 has been removed for numerous cycles. In one embodiment, the shape element 36 further includes at least one of an input sensor 50, e.g., a touch, e.g., capacitive, or a pressure, e.g., resistive sensor. In the embodiment shown, the actuator is a single-acting actuator and it includes an actuator 30 configured to raise the shape element and a spring 28 to lower the shape element. In one embodiment, the actuator 30 includes a contact surface with the base plate 32 that is resilient, deformable or compressible. For example, as the actuator 30 is activated, the contact surface of the actuator 30 is urged against the base plate 32, e.g., by inflating a pneumatic bladder that includes the contact surface in a pneumatic actuator, by actuating a linear actuator having an output end that includes a compressible head which includes the contact surface, or by actuating a linear actuator against a compressible element disposed between the output end of the linear actuator and the base plate 32, etc. In summary, the interface between the base plate 32 and the actuator is required to be resilient, i.e., with a compressible element disposed between the base plate 32 and the actuator regardless of whether the compressible element is part of the actuator, such that a touch or tactile input or downward force at the head 24 of the shape element 36 can cause the lowering of the head 24 and a noticeable reduction in the compression of the spring on sensor 50. In an embodiment not shown, the actuator includes only a double-acting actuator 30 capable of raising and lowering the shape element as the double-acting actuator 30 would be capable of exerting a force along the central axis 52 in a first direction and a second direction opposite the first direction. Referring back to FIG. 5, it shall be noted that the shape element 36 on the left of FIG. 10 may be applied to a shape element 48 of the group of shape elements 48, i.e., the shape elements 48 are disposed in a raised condition and the shape element 36 on the right of FIG. 10 may be applied to a shape element 46 of the group of shape elements 46, i.e., the shape elements 46 are disposed in a state where the shape elements are raised but to a level that is lower than the shape elements 48. In the embodiment shown, the input sensor 50 is disposed between spring 28 and support structure 7. It shall be noted that, the level of compression of the spring 28 and hence a force exerted on the input sensor 50, applied, e.g., by a user's finger 64, through a press along substantially the central axis 52 and a force applied by the actuator 30 along the central axis 52, dictates the amount of force sensed by the input sensor 50 which corresponds to the position of the shape element. It shall then be understood that the control surface is morphable not only by using an actuation of an actuator but also by receiving an input, e.g., via a finger of a user. Alternatively, the input sensor 50 may be disposed at another location as long as a position of the shape element can cause a pressure exertion or capacitive influence to be sensed by the input sensor. In one embodiment, the support structure 7 can include a printed circuit board (PCB) through which a shape element is disposed. The actuators 30, input sensors 50 and light emitters may be functionally connected to controller 8. In one embodiment, the control surface 6 further includes a light emitter 34. As the head 24 is transparent, i.e., light emitted from light emitter 34 through the head 24 is visible to a user 54. In one embodiment, the light emitter 34 can be configured to emit a light of a plurality of colors, hues and luminosity levels. In one embodiment, the output of the light emitter 34 can be altered commensurate with an input to the input sensor 50. In one embodiment, the output of the light emitter 34 can be altered commensurate with the first input. In one embodiment, a rapid cycle of the actuation and de-actuation of the shape element 36 can produce a vibrational effect as an additional control surface attribute useful for engaging an interaction of a user 54.

Figure 11:
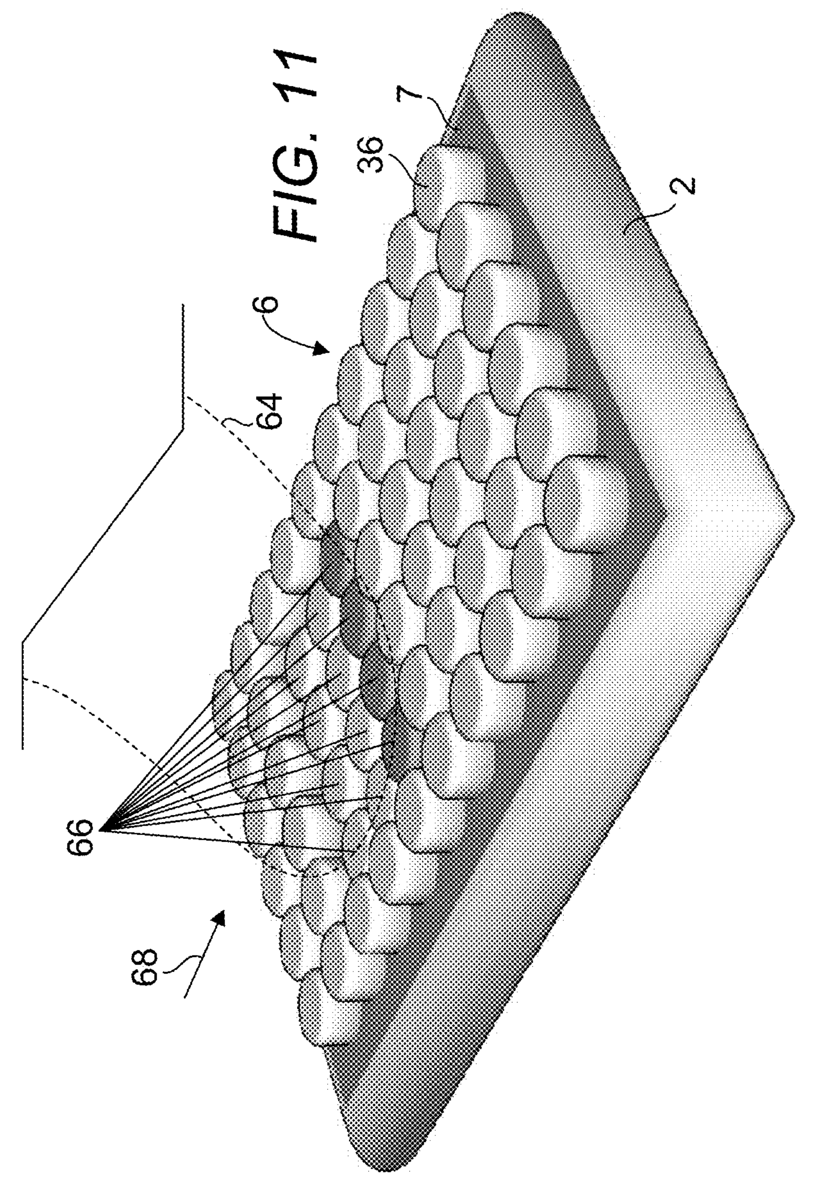
FIGS. 11-12 depict an example of a control surface of a present machine controller.
Figure 12:
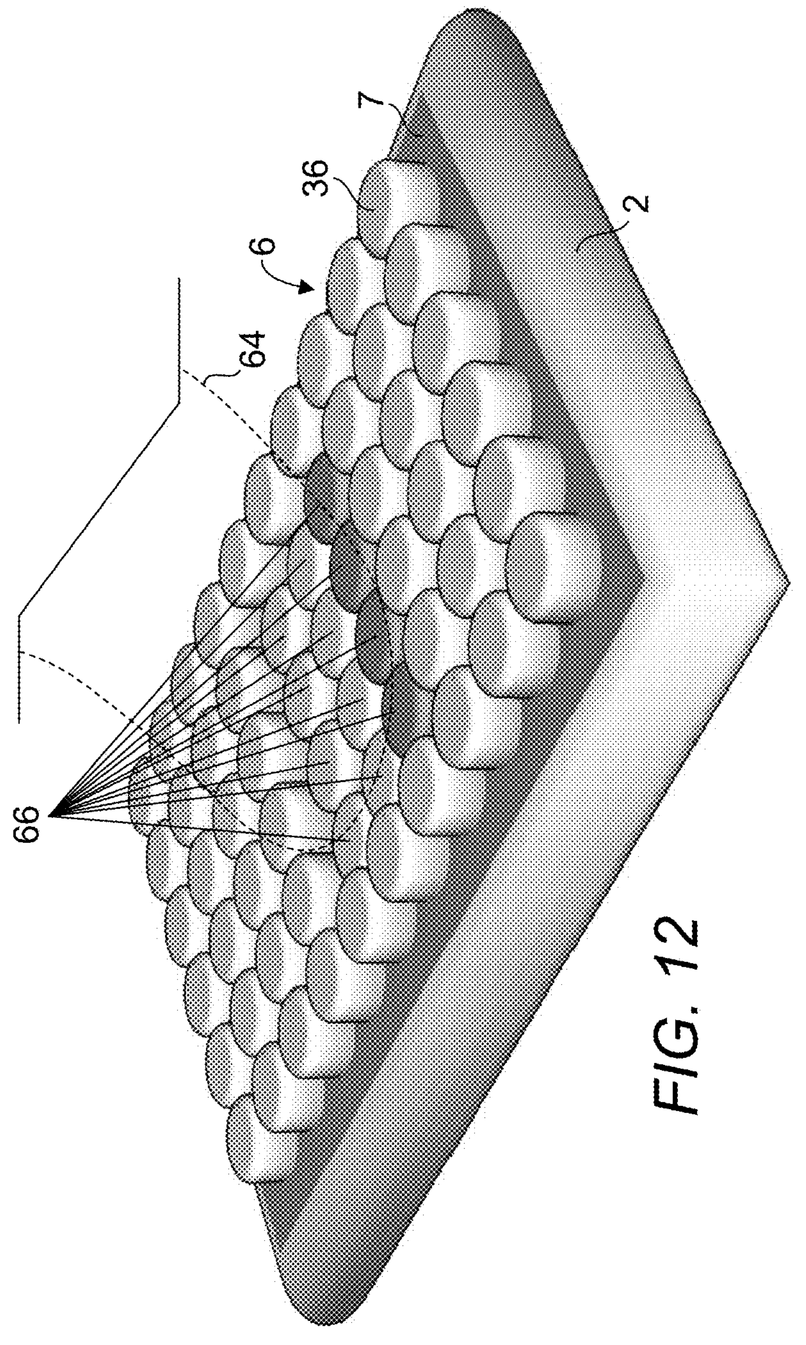

FIGS. 11-12 depict an example of a control surface of a present machine controller. In this embodiment, a surface feature is identified by shape elements that exhibit a lower resistance to a downward force. It shall be noted that, without any force input, the shape elements 36 are disposed in their default raised state. In this embodiment, a force must be exerted upon the shape elements 36 to reveal a dynamic surface feature that is a slider as encompassed by the aggregate of shape elements 66 of FIGS. 11-12. Surface elements 66 are used to show the slider that is formed when a downward force is exerted in direction 68 on the control surface, causing a signal to be generated based on a slider value corresponding to the position and/or downward force of the user input along the slider. A shape element can be disposed in a different illuminated state to indicate the presence of a surface feature. Here, four shape elements in a row are disposed in a contrasting illuminated state to indicate to the user, the presence, position and direction of the slider.

Figure 13:
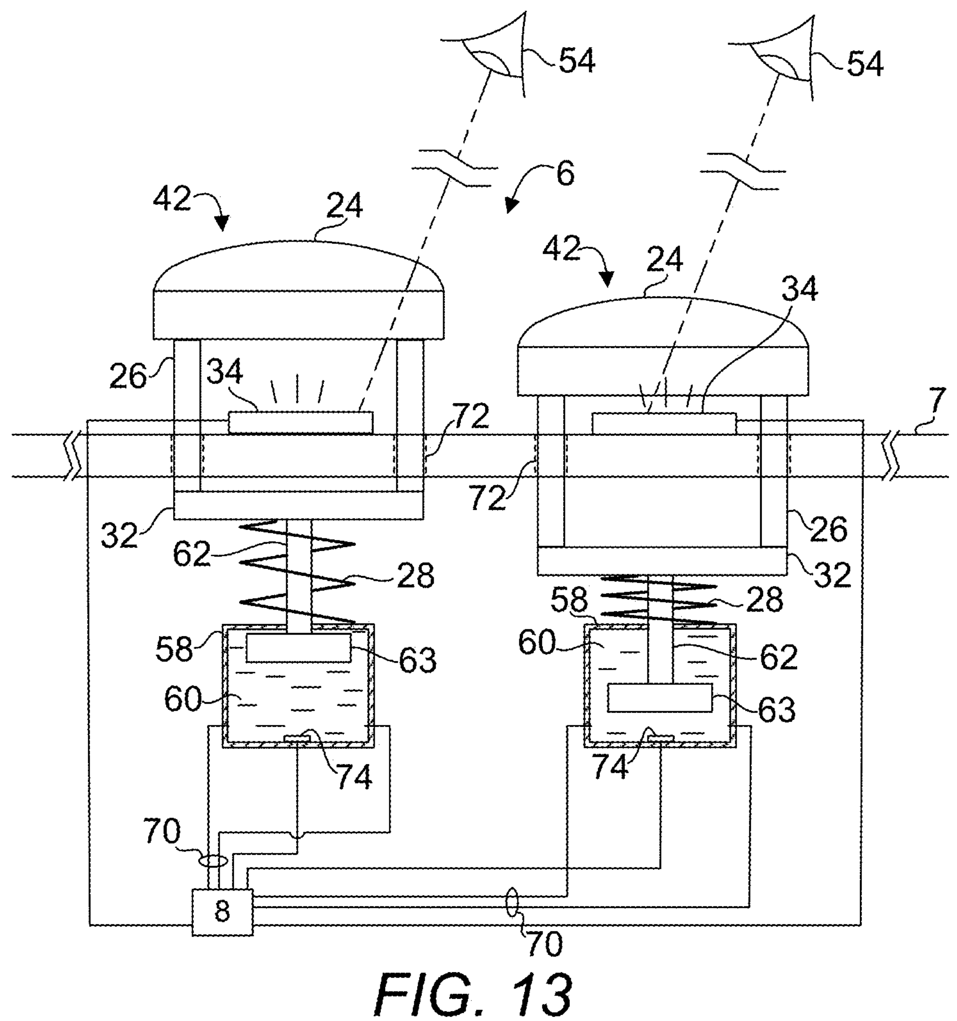
FIG. 13 is a diagram depicting an example of a control surface of a present machine controller.

FIG. 13 is a diagram depicting an example of a control surface 6 of a present machine controller. In contrast to the shape elements of FIG. 10, each of the shape elements of FIG. 13 does not include an actuator 30. Here, the presence of a surface feature is identified by a contrast in shape element resistance to a downward force, e.g., a force exerted by a user's finger. In another embodiment, a surface feature is identified by shape elements that exert a higher resistance to a downward force compared to shape elements disposed adjacent to these shape elements. In one embodiment, a surface feature is identified by shape elements that exert a lower resistance to a downward force compared to shape elements disposed adjacent to these shape elements. The resistance to the downward force is controllable by a resistance controller. Only two shape elements 42 are shown. The shape element 42 on the left side is disposed in a high resistive condition while the shape element 42 on the right side is disposed in a lower resistive condition as evidenced by the deeper penetration of block 63 in the well 58. Each shape element includes a head 24, e.g., a lens, a base plate 32, a member, e.g., at least one post 26, connecting the head 24 and the base plate 32, a spring 28 disposed between a well 58 and the base plate 32, and a resistance controller. The resistance controller includes a rod 62 terminated on one end with a block 63, the well 58 and a resistive fluid 60 disposed therein. In the embodiment, the force resistance experienced in pressing in a shape element 42 is proportional to an electrical resistance of the resistive fluid 60. The resistance controller can further be an active resistance controller 74 where the viscosity of the resistive fluid can be actively altered using, e.g., a controller configured to alter or control magnetic fields through a magnetorheological fluid, thereby altering or controlling the viscosity of the magnetorheological fluid to a desired value. It is this electrical measure that provides a touch indicator. It shall be noted that as the block 63 is lowered in the well 58, the volume of the resistive fluid 60 in the well 58 decreases as the volume of the fluid surrounding the block 63 decreases as an increased amount the rod 62 is disposed in the well 58 taking up the volume previously occupied by a portion of the resistive fluid 60, compressing and raising the viscosity of the resistive fluid 60. In one example, an electrical resistance sensor 70 is provided to detect an electrical resistance of the resistive fluid in the well 58. The electrical potential across two points of the resistive fluid 60 represents the viscosity of resistive fluid 60. A downward force applied on a shape element 42 increases the viscosity of the resistive fluid 60, thereby increasing the resistance experienced in moving the block 63 downwardly toward the resistive fluid 60. When the downward force is removed, spring 28 returns the shape element 42 to its default raised state as shown in the shape element 42 on the left side of FIG. 13 and the viscosity of the resistive fluid decreases as the volume of the resistive fluid occupied by the resistive fluid increases. In one embodiment, the resistive fluid is a rheological fluid, e.g., magnetorheological fluid, etc. Again, in one embodiment, the support structure 7 can include a printed circuit board (PCB) through which a shape element 42 is disposed. In one embodiment, the control surface 6 further includes a light emitter 34. As the head 24 is transparent, light emitted from the light emitter 34 through the head 24 is visible to a user 54. In one embodiment, the light emitter 34 can be configured to emit a light of a plurality of colors, hues and luminosity levels. In one embodiment, the output of the light emitter 34 can be altered commensurate to the electrical resistance of the resistive fluid 60. In one embodiment, the output of the light emitter 34 can be altered commensurate to the first input.

Figure 14:
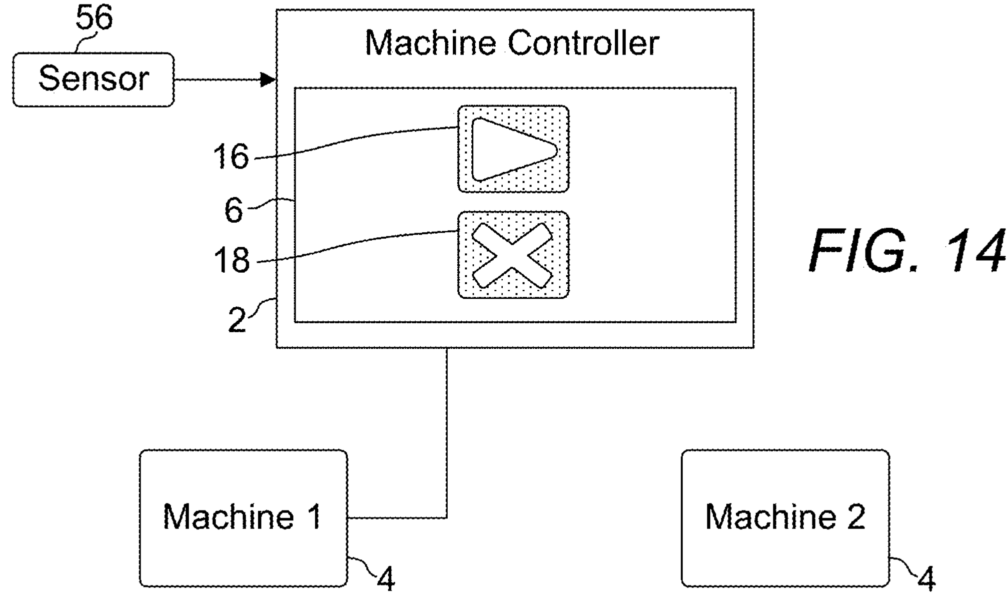
FIG. 14 is a diagram depicting one example of a machine controller configured for communicating with one of a plurality of machines.

FIG. 14 is a diagram depicting one example of a machine controller configured for communicating with one of a plurality of machines. In this embodiment, the machine controller further includes a detector 56 configured to detect the presence of an occurrence to trigger a third input based on the detection of the occurrence, wherein the total input further includes the third input. The detector can be a biometric sensor, a timer, an environmental sensor, a proximity sensor or an image sensor. The biometric sensor can be a fingerprint sensor, a face recognition sensor, an iris recognition sensor, a hand geometry sensor, a DNA sensor, a voice recognition sensor, a signature sensor, a capacitive sensor, an optical sensor, an ultrasonic sensor, an RF sensor, a thermal sensor or a pressure sensor. The environmental sensor can be a sound detector, a motion detector, a temperature detector, a humidity detector, a chemical detector, a gas detector, a liquid detector, an atmospheric pressure detector, a location detector or an orientation detector. The proximity sensor can be an inductive proximity sensor, a capacitive proximity sensor, an ultrasonic proximity sensor or an infrared (IR) proximity sensor.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A morphable surface for receiving a tactile input of a user and displaying to the user, said morphable surface comprising:

(a) a support structure comprising a top surface and a bottom surface; and (b) at least one shape element intersecting the support structure and movable relative thereto, said at least one shape element comprising:

(i) a head;

(ii) a base plate;

(iii) at least one post configured to connect said head at a top end of said at least one post and said base plate at a bottom end of said at least one post, wherein said head is disposed above said support structure, said base plate is disposed below said support structure, and said at least one post extends through and physically intersects said support structure to guide translational movement of said at least one shape element relative to said support structure;

(iv) a spring configured to be disposed between said bottom surface of said support structure and said base plate;

(v) an actuator configured to urge against said base plate, said actuator further configured to be disposed in a first state and a second state, wherein said first state corresponds to a state in which said actuator is configured to push against said base plate in a push action in a first direction from said base plate to said head and said second state corresponds to a state in which said push action is removed; and (vi) a compressible element disposed between said actuator and said base plate, wherein when said actuator is disposed in said first state, said actuator comes in contact with said base plate and pushes against said base plate, compressing said spring and urging said head in said first direction, when said actuator is disposed in said second state, said push action is removed, allowing said spring to urge said head in said second direction, and wherein a tactile input applied by the user to said head causes compression of said compressible element and displacement of said base plate in said second direction while reducing compression of said spring.

2. The morphable surface of claim 1, further comprising an input sensor configured to detect a contact of a user at said head and said input sensor is configured to be disposed on said bottom surface of said support structure between said spring and said support structure.

3. The morphable surface of claim 1, further comprising a light emitter configured to be disposed on said top surface of said support structure between said head and said support structure.

4. The morphable surface of claim 1, wherein said head is a lens constructed from a light-transmissible material.

5. A machine controller for controlling a first machine er and a second machine, said machine controller comprising:

(a) a control surface comprising a plurality of alterable physical properties; and (b) a control device is functionally connected to said control surface and configured to:

(i) communicate, in a first instance, with the first machine;

(ii) communicate, in a second instance, with the second machine;

(iii) receive, in the first instance, a first input from the first machine, said first input being indicative of a type of the first machine;

(iv) receive, in the second instance, a first input from the second machine, said first input being indicative of a type of the second machine;

(v) receive a second input from said control surface;

(vi) generate a first instruction to change at least one of said plurality of alterable physical properties of said control surface into a first physical configuration associated with the first machine based on said first input received from the first machine;

(vii) generate a second instruction to change at least one of said plurality of alterable physical properties of said control surface into a second physical configuration associated with the second machine based on said first input received from the second machine, wherein said second physical configuration is different from the first physical configuration;

(vii) generate, in the first instance, a control instruction directed to the first machine in response to the second input; and (viii) in the second instance, a control instruction directed to the second machine in response to the second input, wherein each of the first machine and the second machine comprises a visual display and said machine controller is a remote controller.

6. The machine controller of claim 5, wherein said plurality of alterable physical properties comprise a property selected from the group consisting of shape, color, texture, surface properties and any combinations thereof.

7. The machine controller of claim 6, wherein said color is configured to be displayed in a plurality of hues and a plurality of luminosity levels.

8. The machine controller of claim 6, wherein said shape comprises a shape selected from the group consisting of a dial, a button, a switch, a slider, a knob, a directional pad and any combinations thereof.

9. The machine controller of claim 5, wherein said control surface comprises a support structure, a shape element disposed in a first position and an intersecting relationship with respect to said support structure and an actuator configured to dispose said shape element in a second position.

10. The machine controller of claim 9, further comprising a resilience member configured to return said shape element to said first position.

11. The machine controller of claim 9, further comprising a shape element contact detector configured to detect a contact with said shape element, wherein said second input comprises a contact input to said shape element.

12. The machine controller of claim 11, wherein the contact is a contact selected from the group consisting of touch and pressure, said shape element contact detector for touch is a capacitive touch detector and said shape element contact detector is a resistive touch detector.

13. The machine controller of claim 5, further comprising a light emitter.

14. The machine controller of claim 5, further comprising a detector configured to detect the presence of an occurrence to trigger a third input based on the detection of said occurrence, wherein said total input further comprises said third input.

15. The machine controller of claim 5, further comprising an audio component configured for emitting sound, wherein said audio component is functionally connected to said control device.

16. The machine controller of claim 5, wherein said control surface comprises a support structure, a shape element disposed in a first position and an intersecting relationship with respect to said support structure and a resistance controller configured to present a variable resistance to a movement of said shape element to a second position.

* * * * *